United States Patent
Homan

(10) Patent No.: US 8,021,260 B2
(45) Date of Patent: Sep. 20, 2011

(54) TRANSMITTING TORQUE LIMITING APPARATUS FOR VEHICLE

(75) Inventor: Akinori Homan, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 799 days.

(21) Appl. No.: 12/066,841

(22) PCT Filed: Sep. 14, 2006

(86) PCT No.: PCT/JP2006/318672
§ 371 (c)(1),
(2), (4) Date: Mar. 14, 2008

(87) PCT Pub. No.: WO2007/032554
PCT Pub. Date: Mar. 22, 2007

(65) Prior Publication Data
US 2009/0181820 A1 Jul. 16, 2009

(30) Foreign Application Priority Data
Sep. 15, 2005 (JP) ................. 2005-269079

(51) Int. Cl.
*F16H 48/06* (2006.01)
*F16H 48/20* (2006.01)
(52) U.S. Cl. ......... 475/235; 475/236; 475/240; 475/249
(58) Field of Classification Search ........... 475/235, 475/236, 223, 224, 231, 234, 240, 241, 249; 74/650
See application file for complete search history.

(56) References Cited

U.S. PATENT DOCUMENTS

| 2,855,805 | A |   | 10/1958 | Fallon |        |
|-----------|---|---|---------|--------|--------|
| 3,027,781 | A | * | 4/1962  | O'Brien | 475/231 |
| 3,605,523 | A | * | 9/1971  | O'Brien | 475/234 |
| 3,762,241 | A | * | 10/1973 | Roper   | 475/240 |
| 4,059,026 | A |   | 11/1977 | Stritzel |       |
| 4,249,429 | A |   | 2/1981  | Denning |        |
| 4,290,321 | A | * | 9/1981  | Wilson  | 475/235 |
| 4,829,849 | A |   | 5/1989  | Masuda et al. | |

FOREIGN PATENT DOCUMENTS

| DE | 27 06 052   | 8/1978  |
| JP | 53-090334   | 7/1978  |
| JP | 59-131652   | 9/1984  |
| JP | 10-252857   | 9/1998  |
| JP | 2001-271904 | 10/2001 |
| JP | 2004 278762 | 10/2004 |

OTHER PUBLICATIONS

"New-Type Car Manual Toyota Celsior", 1988.
Japanese Office Action mailed May 10, 2011, issued in Japanese patent application No. 2005-269079 (with partial English translation).

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

A transmitting torque limiting apparatus, used in a power transmitting apparatus, includes side gears (40) and side gears piece (42) one of which are axially shiftable. The side gears (40) and the side gear pieces (42) respectively have first engaging teeth (60*a*) and second engaging teeth (60*b*) each being provided with a pressure angle (Alpha). Due to such pressure angle, when an excessive torque is inputted into the power transmitting apparatus, a thrust force (F1) is generated for disengaging the engagement between the first engaging teeth (60*a*) and second engaging teeth (60*b*). Thus, inputting of the excessive torque into the power transmitting apparatus can be limited.

13 Claims, 6 Drawing Sheets

TRANSMITTING TORQUE LIMITING APPARATUS FOR VEHICLE

TECHNICAL FIELD

The present invention relates to a transmitting torque limiting apparatus for vehicle, used for example in a power transmission apparatus, and limits an inputting of excessive torque into the power transmitting apparatus, upon for example a quick start of a vehicle.

BACKGROUND ART

The power transmission apparatus for vehicle is provided in a power transmitting path from an engine to driving wheels to transmit power generated at the engine to each of drive wheels. Normally, it is constructed by a transmission, propeller shaft, final reduction device, drive shaft and the like. For example, "New-type Car Manual TOYOTA CELSIOR" (issued by TOYOTA JIDOSHA KABUSHIKI KAISHA in November, 1988) disclosed a general final reduction apparatus which includes a reduction device and a differential device constructed integrally. A driving torque of the engine is inputted into the power transmitting device and then is transmitted to the driving wheels, while a reacting torque balancing with the driving torque is inputted from the driving wheels into the power transmitting apparatus.

There is a demand for improvement of power performance of the vehicle, and an output of the power source, grip force of tire, suspension device and the like are improved to satisfy such the demand. Here, when the vehicle is started quickly, or the vehicle is running on a rough-surface road, the drive wheel(s) floated up momentarily from the road, and the driving torque and the reacting torque momentarily decreases.

Thenafter, at the moment of landing of the driving wheels on the road, extremely large driving torque and reacting torque are inputted into the power transmission apparatus. This may cause a temporary shortage of the transmission capacity of a rotary shaft such as a driving shaft, propeller shaft and the like, or capacity of gears arranged in a differential device, automatic transmission device and the like. Thus, durability of the shafts or gears may be lowered.

For overcoming the above problem, it is conceivable tor example to make size of the shafts and the gears large to thereby increase strength of them, whereby the power transmission capacity of the shafts and the gears is increased. However, there is fear that strengthened shafts and the gears may make the power transmission apparatus large-sized and heavy-weighed, so that quality of the vehicle may be lowered.

DISCLOSURE OF THE INVENTION

The present invention was made in view of the circumstances described above. It is therefore an object of the present invention to provide a transmitting torque limiting apparatus which is used in the power transmitting apparatus and which can limit inputting of the excessive torque thereinto resulted from the quick start of vehicle and the like, without inviting large-size or heavy-weight of the power transmission apparatus.

The invention recited in the claim 1 is featured by a transmitting torque limiting apparatus for vehicle, constructing a part of a power transmitting apparatus disposed in a power transmitting path extending from a power source to driving wheels, for limiting inputting of an excessive torque into the power transmitting apparatus, comprising (a) a first rotary member rotated about an axis by the power source; (b) a second rotary member disposed adjacent to the first rotary member on the power transmitting path to be rotated about the axis; (c) first engaging teeth and second engaging teeth respectively provided on the first rotary member and the second rotary member to be meshed with each other; and (d) an biasing mechanism for biasing one of the first rotary member and the second rotary member which is shiftable toward other of them so that the first engaging teeth and the second engaging teeth are meshed with each other;

wherein each of the first engaging teeth and each of the second engaging teeth are provided with a pressure angle of predetermined value which function to shift the shiftable rotary member against the biasing force by the biasing mechanism to thereby disengage engagement between the first engaging teeth and the second engaging teeth, when an excessive torque larger than the predetermined value is inputted to the first rotary member or the second rotary member.

According to the invention recited in the claim 1, when the extremely large drive torque and reacting torque are inputted into the power transmitting apparatus, for example upon the quick start of the vehicle, on account of the pressure angles respectively provided for the first engaging teeth of the first rotary member and the second engaging teeth of the second rotary member, the shiftable rotary member is shifted axially relative to the non-shiftable rotary member.

As a result, the thrust force thus generated and larger than the biasing force by the biasing mechanism functions to disengage the engagement between the first engaging teeth and the second engaging teeth. In this, way, inputting of the excessive torque into the power transmitting apparatus can be limited.

The invention recited in the claim 2 is featured by the transmitting torque limiting apparatus, wherein a pair of tooth surfaces of each of the first engaging teeth are provided with a pair of pressure angles of different values, and a pair of tooth surfaces of each of the second engaging teeth are provided with a pair of pressure angles of different values.

According to the invention recited in the claim 2, the paired pressure angles are different between the paired tooth surfaces of the first engaging tooth, and between the paired tooth surfaces of the second engaging tooth. Accordingly, the critical torque value at which engagement between the first engaging tooth and second engaging tooth is disengaged can be altered between the forward running and the reverse running of the vehicle. Thus, inputting of the excessive torque can be limited or avoided in both the forward running and the reverse running at the suitable value respectively.

The invention recited in the claims 3 and 4 is featured by the transmitting torque limiting apparatus, wherein the biasing mechanism is a disc spring or a coil spring which is disposed coaxially with the second rotary member and of which one end is abutted to the shiftable rotary member to bias the shiftable rotary member toward the non-shiftable rotary member.

According to the invention recited in the claims 3 and 4, the disc spring or the coil spring can always bias the shiftable rotary member toward the non-shiftable rotary member with constant biasing force. Also, magnitude of the biasing force can be adjusted by exchanging the disc spring and the coil spring, depending on usage of the vehicle.

The invention recited in the claims 5 and 6 is featured by the transmitting torque limiting apparatus, wherein the biasing mechanism includes a pressurized oil chamber which contains a pressurized hydraulic oil for biasing the shiftable rotary member toward the non-shiftable rotary member.

According to the invention recited in the claims 5 and 6, the pressurized hydraulic circuit can apply the biasing force larger than that of the disc spring or the coil spring, which is effective when the present invention is applied to the special vehicle which requires larger limiting force.

The invention recited in the claim 7 is featured by the transmitting torque limiting apparatus, (i) wherein the transmitting torque limiting apparatus is a differential gear unit including a pair of side gears, a pair of side gear pieces, a pair of side gear shafts, and a pair of disc springs, and (ii) wherein the side gears constructing the first rotary member are rotatably fitted on an outer peripheral surface of the side gear shafts; the side gear pieces constructing the second rotary member are spline-fitted on an outer peripheral surface of the side gear shafts to be rotated integral therewith and axially shiftable relative thereto, and to be adjacent to the side gears; the first engaging teeth and the second engaging teeth are respectively provided on an abutment surface of the side gears and an abutment surface of the side gear pieces adjacent thereto; and the biasing mechanism is constructed by the pair of disc springs biasing the side gear pieces toward the side gears.

According to the invention recited in the claim 7, when the large torque (i.e. the driving torque and the reacting torque) is applied to the differential gear unit, due to the thrust force generated by the pressure angle provided for the first engaging tooth and the second engaging tooth, the side gear piece is shifted relative to the side gear. As a result, the engagement between the first engaging tooth and the second engaging tooth is disengaged, when the thrust force becomes larger than the biasing force, to limit inputting of the excessive torque into the power transmitting apparatus.

The invention recited in the claim 8 is featured by the transmitting torque limiting apparatus, (i) wherein the transmitting torque limiting apparatus is a differential gear unit including a pair of side gears, a pair of side gear pieces, a pair of side gear shafts, and a pair of disc springs, and (ii) wherein the side gear pieces constructing the first rotary member are spline-fitted on an inner peripheral surface of the side gear to be rotated integral therewith and axially shiftable relative thereto; the side gear shafts constructing the second rotary member are adjacent to the side gear pieces; the first engaging teeth and the second engaging teeth are respectively provided on an abutment surface of the side gear pieces and an abutment surface of the side gear shafts adjacent thereto; and the biasing mechanism is constructed by the pair of coil springs biasing the side gear pieces toward the side gear shafts.

According to the invention recited in the claim 8, when the large torque (i.e. the driving torque and the reacting torque) is applied to the differential gear unit, due to the thrust force generated by the pressure angle provided for the first engaging tooth and the second engaging tooth, the side gear pieces are shifted relative to the side gear shafts. As a result, the engagement between the first engaging tooth and the second engaging tooth is disengaged, when the thrust force becomes larger than the biasing force.

The invention recited in the claim 9 is featured by the transmitting torque limiting apparatus, wherein each of the side gears has an annular shape, each of the side gear pieces has an annular shape having a diameter smaller than that of the side gear, and the side gear piece is held in a recess formed on an end surface of the side gear in a nested state. According to the invention recited in the claim 9 in which the gear piece is held in the side gear in the nested state, total axial length of the side gear and the side gear piece can be shortened.

The invention recited in the claim 10 is featured by the transmitting torque limiting apparatus, wherein the side gear pieces and the side gear shafts have respectively a cylindrical shape, and disposed to form one line.

The invention recited in the claim 11 is featured by the transmitting torque limiting apparatus, wherein a driving torque is transmitted via the side gears, the side gear pieces and the side gear shafts in this order, and in the transmitting path of the drive torque the side gears are disposed upstream of the side gear pieces.

The invention recited in the claim 12 is featured by the transmitting torque limiting apparatus, wherein a driving torque is transmitted via the side gears, the side gear pieces and the side gear shafts in this order, and in the transmitting path of the driving torque the side gear pieces are disposed upstream of the side gear shafts.

BRIEF DESCRIPTION OF THE DRAWINGS

The above and other objects, features, advantages and industrial and technical significance of the present invention will be better understood, by reading the following detailed description of preferred embodiments of the invention, when considered in connection with the drawings.

BEST MODE FOR CARRYING OUT THE INVENTION

Figure 1:
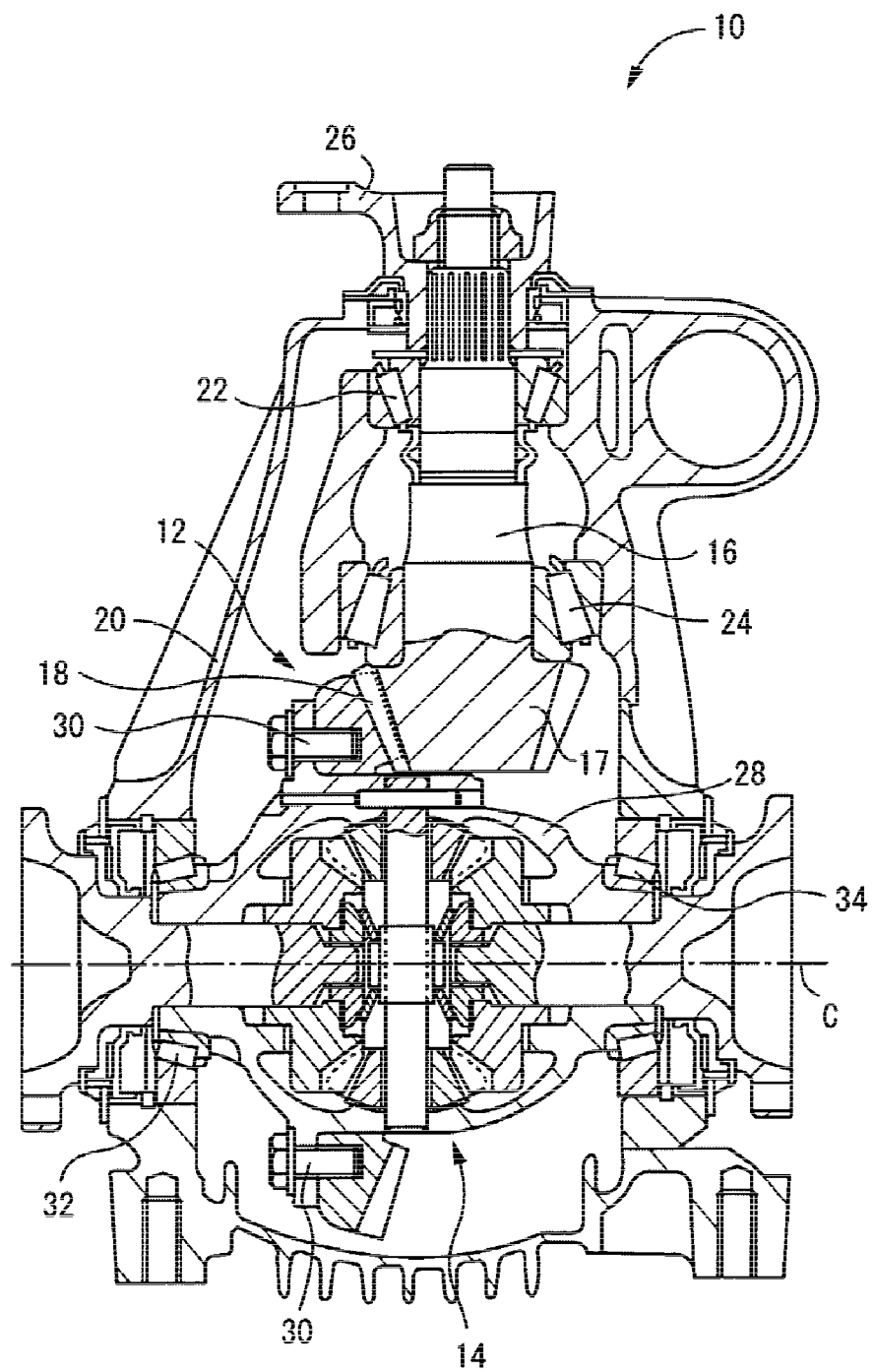
FIG. 1 is a cross section of a differential apparatus to which a transmitting torque limiting apparatus according to a first embodiment of the present invention is applied and which shows an entire construction of the differential apparatus.

Referring to the drawings, there will be described in detail the preferred embodiments of the present invention.

First Embodiment

FIG. 1 is a cross section of a differential apparatus 10 which constructs a part of the power transmitting apparatus and which shows one embodiment of the present invention. This differential apparatus 10 is used in a FR (front engine, rear drive) type vehicle at a rear part thereof, to absorb difference of the number of rotations between the left wheel and the right wheel for allowing the vehicle to run along a curved road. Driving torque generated at an engine (not shown) is, after gear-shifted at a transmission (not shown), transmitted to the differential apparatus 10 via a propeller shaft (not shown).

The differential apparatus 10 includes a final reduction device 12 and a differential gear unit 14 constructed integral with each other. The final reduction device 12 is constructed by a drive pinion 16, and a ring gear 18 meshed therewith. The drive pinion 16 is joined to a rear end of the propeller shaft and is rotatably supported by a fixed housing 20 via bearings 22 and 24. To a front end of the drive pinion 16 a flange 26 is spline-fitted, with which a propeller shaft is joined by a bolt so that the drive pinion 16 is rotated by propeller shaft.

The ring gear 18 meshed with a gear 17 provided at a rear end of the drive pinion 16 is joined to a differential case 28 of the differential gear unit 14 by a bolt 30, as will be explained.

The final reduction device 12 reduces rotation of the drive pinion 16 and transmit the reduced rotation to the differential gear unit 14. The differential gear unit 14 includes a rotary differential case 28, and a pair of pinion gears 38, a pair of side gears 40 and the like disposed therein. The differential case 28 made of a cast iron is rotatably supported by the housing 20 via bearings 32 and 34. This differential case 28 is joined to the ring gear 18, as will be explained later, to be rotated about an axis C of the side gear shafts 44.

Figure 2:
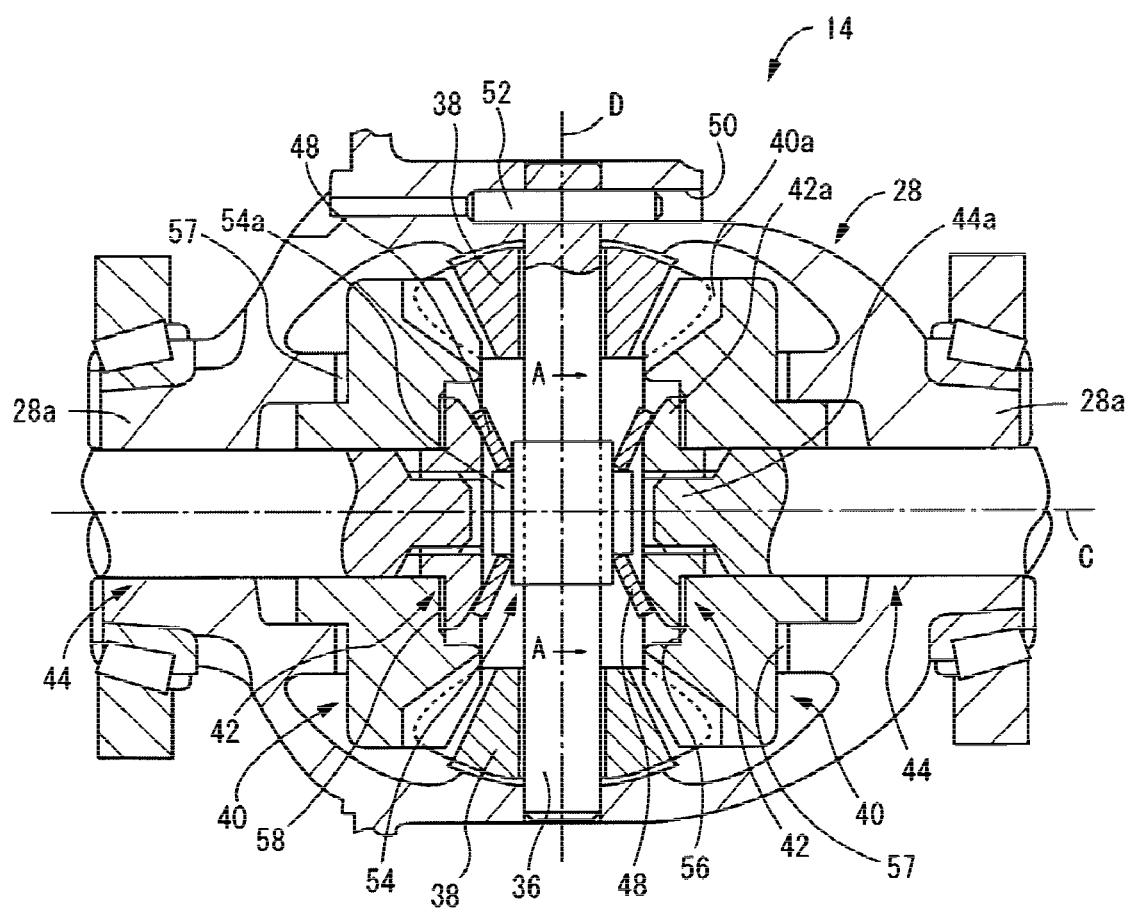
FIG. 2 is a partial enlarged view showing a differential gear unit of the differential apparatus shown in FIG. 1.

FIG. 2 is a partial cross section which enlarges the differential gear unit 14 shown in FIG. 1. The differential gear unit 14 includes, in the differential case 28, a pinion shaft 36, a pair of pinion gears 38, a pair of side gears 40, a pair of side gear pieces 42, a pair of side gear shafts 44, and a pair of disc springs 48. Here, the differential gear unit 14 is constructed symmetrically with respect to the axis C of the paired gear shafts 44, and the axis D of the pinion shafts 36 perpendicular to the axis C.

The differential case 28 is provided with a pair of tabular parts 28a at both axial ends thereof coaxially with the axis C to support a pair of side gear shafts 44 rotatable relative to the differential case 28a. On outer peripheral surfaces of the paired side gear shafts 44, the paired side gears 40 of an annular shape are mounted rotatable relative to the side gear shafts 44. Each of the paired side gears 40 is provided, at an end surface facing to the pinion shaft 36, a recess 56 for receiving the side gear piece 42.

Into the differential case 28, the pinion shaft 36 including a plane parallel to the above drive pinion 16 is inserted in the direction perpendicular to the paired side gear shafts 44. A fix pin 52 inserted into a hole 50 formed in the differential case 28 penetrates the pinion shaft 36 perpendicular to the axis D thereof to thereby prevent the axial movement of the pinion shaft 36. In this way, the pinion shaft 36 rotates integrally with the differential case 28.

At both axial ends of the pinion shaft 36, a pair of pinion gears 38 are rotatably supported and are respectively meshed with a gear 40a of each of the side gears 40. On an axially intermediate portion of the pinion shaft 36, a positioning member 54 of a square pillar shape and having a pair of cylindrical positioning protrusions 54a is fixedly attached at an outer peripheral surface.

At inner axial ends of the side gear shafts 44 opposed to each other a pair of small-diameter shaft portions 44a are respectively provided, and on an outer peripheral surface of the small-diameter shaft portion 44a the side gear piece 42 of an annular shape is spline-fitted. In detail, the side gear piece 42 is held in the recess 56 formed on an end surface of the side gear 40 in a nested state.

Thus, the side gear pieces 42 are rotated about the axis C together with the side gear shafts 44, but are shiftable relative to the side gear shafts 44 in the direction of the axis C. In this embodiment, both the side gear pieces 42 corresponding to the claimed second rotary member and side gears 40 corresponding to the claimed first rotary member are rotatable about the common axis C.

Each of the side gears 42 is provided with a flange portion 42a extending radially outwardly. On an end surface of the flange portion 42a facing to the pinion shaft 36 the disc spring 48 is abutted at one end portion thereof, and other end portion of the disc spring 48 is attached to an outer peripheral surface of the positioning protrusion 54a. In this way, the disc spring 48 biases the side gear pieces 42 toward the side gears 40 axially. Here, the disc spring 48 corresponds to the claimed biasing mechanism.

On the other hand, other end surface of the flange portion 42a of each side gear piece 42 is abutted onto a bottom surface 58 of the recess 56 formed on the side gear 40. At an end surface of the side gear 40 opposite to a bottom surface 58, the side gear 40 is abutted onto the differential case 28 via a thrust ring 57, to be prevented from further axial shift.

Figure 3:
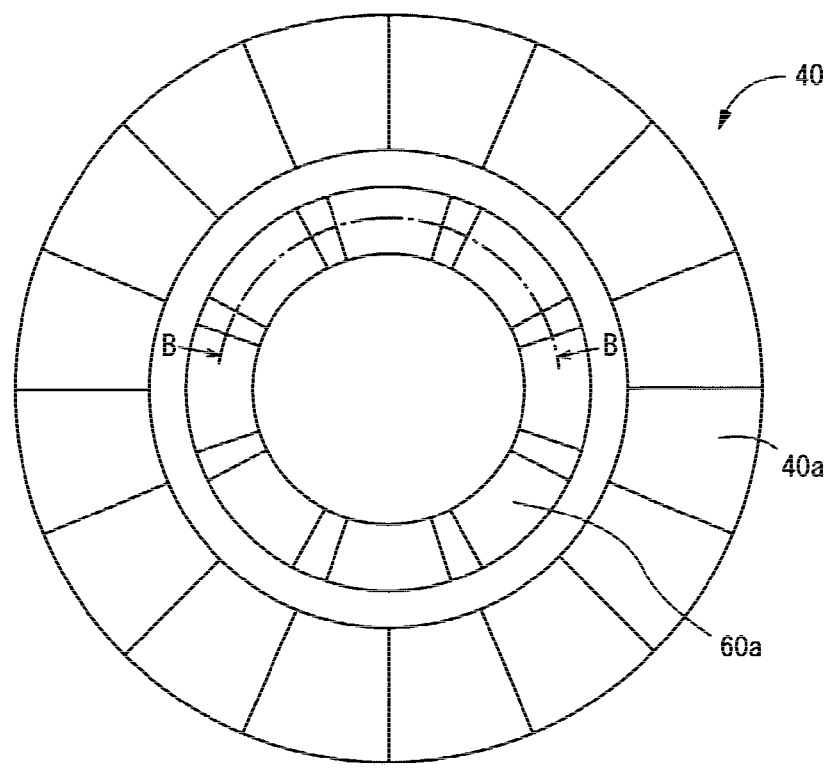
FIG. 3 is a view taken along a line A in FIG. 1 and shows a side gear.

Each of the side gear pieces 42 and each of the side gears 40 are respectively provided with plural engaging teeth 60b and plural engaging teeth 60a meshed with each other, which will be fully explained later. FIG. 3 is a schematic view of the side gear 40 shown in FIG. 2, viewed from a direction of the arrow A.

As shown in FIG. 3, the side gear 40 has plural radially outer engaging teeth 40a and plural radially inner engaging teeth 60a, both being arranged circumferentially with a predetermined pitch. With the outer engaging teeth 40a the pinion gear 38 is meshed, while with the inner engaging teeth 60a the engaging teeth 60b of the gear piece 42 are meshed.

Figure 4:
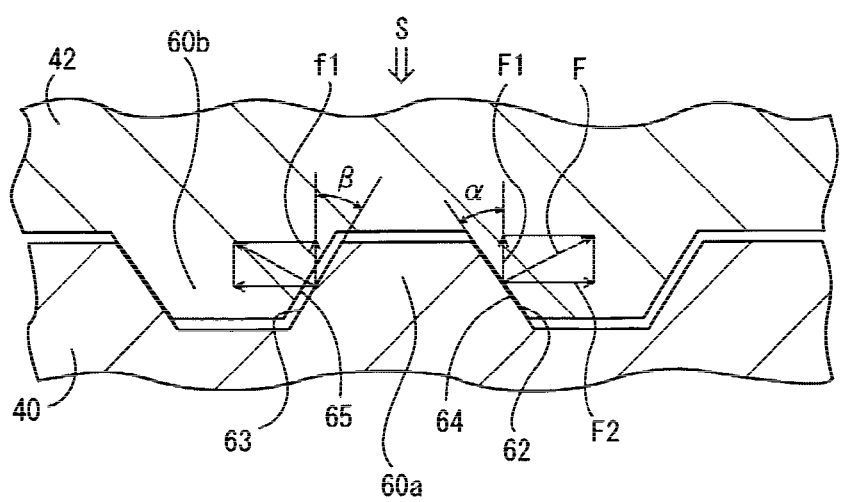
FIG. 4 is a cross section taken along a line B in FIG. 2.

FIG. 4 is a cross section taken along a line B in FIG. 3, in which in addition to the engaging teeth 60a of the side gear 40, the engaging teeth 60b of the side gear piece 42 are shown for explaining the meshed condition therebetween. Each of the engaging teeth 60a of the side gear 40 has one tooth surface 62 having a pressure angle α and other tooth surface 63 having a pressure angle β which is different from the pressure angel α. A tooth surface 64 and a tooth surface 65 of the engaging tooth 60b of the side gear piece 42 have a pressure angle α and a pressure angle β, respectively. Here, the pressure angles α and β are defined as angles between the tooth surfaces 62 and 63, and a plane including the axis D.

Thus, the tooth surfaces 62 and 64 are abutted in a face contact to each other by the pressure angle α, and the tooth surfaces 63 and 65 are abutted in a face contact to each other by the pressure angle β. When the vehicle runs forward, the driving torque transmits through the tooth surfaces 62 and 64, while when the vehicle runs reversely the driving torque transmit through the tooth surfaces 63 and 65.

In the differential gear unit 14 thus constructed, upon forward running of the vehicle, the driving torque is transmitted from the pinion shaft 36, via the pinion gears 38, the side gears 40 and the side gear pieces 42, to the paired side gear shafts 44. In the transmitting path of the drive torque, the side gear 40 is located upstream of the side gear piece 42. The reacting torque is transmitted from the side gear piece 42 to the side gear 40. Here, as shown in FIG. 4, the engaging teeth 60a of the side gear 40 and the engaging teeth 60b of the gear piece 42 are meshed with each other. As shown by arrow F, force F perpendicular to the tooth surface 62 and resulting from the driving torque acts on the tooth surface 64 of the engaging tooth 60b.

Needless to say, the force (not shown) having the same magnitude as the force F and opposite direction to the above force F resulting from the reacting torque acts onto the tooth surface 62 of the engaging tooth 60a from the tooth surface 64 of the engaging tooth 60b. However, axial shift of the side gear 40 is hindered by the differential case 28.

Due to the pressure angle α of the tooth surfaces 62 and 64, the above force F can be decomposed to a thrust component F1 and a circumferential component F2 perpendicular thereto. The thrust component F1 in the direction of the axis D functions to disengage the engaging tooth 60b from the engaging tooth 60a. The circumferential component F2 functions to transmit the driving torque from the side gear 40 to the side gear piece 42. In FIG. 4, an arrow S shows a biasing force applied by the disc spring 48 which biases the side gear piece 42 toward the side gear 40.

It is noted that magnitude of the force F varies depending on running condition of the vehicle, whereas magnitude of the biasing force by the disc spring 48 is substantially constant regardless of the running condition. Upon forward running of the vehicle, when the thrust component F1 exceeds the biasing force S, the side gear piece 42 is shifted axially to be remote from the side gear 40 (upwardly in FIG. 4), so that the engaging teeth 60b may disengage from the engaging teeth 60a.

Here, magnitude of a critical torque at which engagement between the engaging teeth 60a and the engaging teeth 60b is disengaged from each other is determined in view of the magnitude of the drive torque (reacting torque), and can freely be adjusted by changing the pressure angle α of the engaging tooth 60a and the engaging tooth 60b, and the biasing force of the disc spring 48.

In addition, the other tooth surface 63 of the engaging tooth 60a has the pressure angle β different from the pressure angle α. When the vehicle is running reversely, the tooth surfaces 63 and 65 are abutted to each other, to generate the thrust component f1 of which magnitude is different from the above thrust component F1. In this way, the critical torque has the different magnitude between the forward running and the reverse running, and can be adjusted corresponding to the strength required for the engaging teeth.

According to the first embodiment as described above, the paired side gears 40 functioning as the first rotary member and the paired side gear pieces functioning as the second rotary member are respectively provided with the engaging teeth 60a and the engaging teeth 60b. The tooth surface 62 and the tooth surface 64 are formed to have the same pressure angle α. Accordingly, when the torque of the magnitude larger than the predetermined threshold value is inputted into the differential gear unit 14 from the pinion shaft 36 and from the paired side gear shafts 44, the thrust force F1 acts from the engaging tooth 60a to the engaging tooth 60b.

When the thrust component F1 becomes larger than the biasing force S, the side gear pieces 42 shift axially inwardly (refer to FIG. 2) relative to the side gears 40, so that the engaging teeth 60b are disengaged from the engaging teeth 60a. That is, the top portions of the engaging teeth 60b get over the top portions of the engaging teeth 60a, to thereby limit transmission of driving torque and the reacting torque which is larger than the predetermine threshold.

In this way, even upon the quick starting of the vehicle and the like, inputting or transmission of the excessive drive torque from the pinion shaft 36 to the side gear shafts 44 is limited at the differential gear unit 14. Likewise, inputting or transmission of the excessive reaction torque from the side gear shafts 44 to the pinion shaft 36 is limited at the differential gear unit 14.

Also, according to the first embodiment, following advantages can be obtained. Firstly, different values of the pressure angles α and β are provided for one tooth surfaces 62 and 64, and for other tooth surfaces 63 and 65. As a result, the critical torque values at which the engaging tooth 60a and the engaging tooth 60b are disengaged from each other upon forward running and the reverse running of the vehicle can be obtained. Thus, in both the forward running and reverse running, transmitting of the excessive driving torque and excessive reacting torque can be limited.

Secondly, the disc spring 48 provided for biasing the side gear pieces 42 toward the side gears 40 can always apply the biasing force S of the constant magnitude, which can realize stable disengagement of the side gear pieces 42 from the side gears 40. Preferable magnitude of biasing force S can be adjusted by exchanging the disc spring 48, in view of tolerance of the elements constructing the differential gear unit 14. In addition, the disc spring 48 which biases the side gear pieces 42 toward the side gears 40 functions as a LSD (limited slip differential). The LSD prevents slip of one wheel which is slipping when for example the vehicle is dashed in a muddy road.

Thirdly, on account of provision of the positioning member 54, the disc spring 48 will not shifted or disengaged from the predetermined position on the pinion shaft 36. In addition, the side gear piece 42 is disposed within the recess 56 formed on the end surface of the side gears 40, which is effective to shorten length in the axial direction C of the differential gear unit 14.

Second Embodiment

Next, a second embodiment of the present invention will be explained. In the following explanation, members having structure which is the same as the first embodiment are shown by the same reference numerals and detail explanation thereof is omitted.

Figure 5:
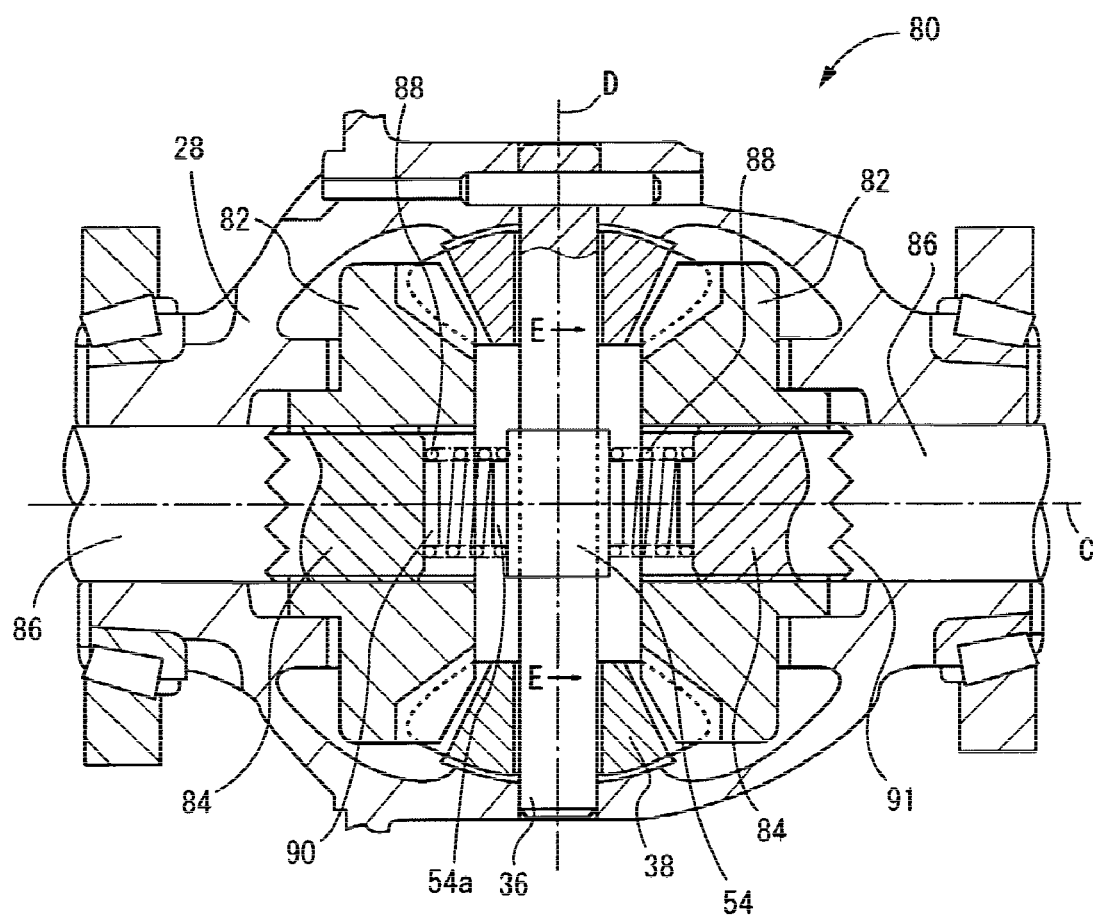
FIG. 5 is a cross section of a differential gear unit according to the second embodiment of the present invention.

FIG. 5 is a partial cross section showing a differential gear unit 80 according to the second embodiment. The differential gear unit 80 has modified structure of a paired side gears 82, the paired side gear pieces 84, and paired side gear shafts 86, and the biasing mechanism is comprised of a coil spring 88, compared with the differential gear unit 14 in the first embodiment.

In detail, on an inner peripheral surface of a hole of each hollow side gear 82, the cylindrical side gear piece 84 is spline-fitted, so that the side gear piece 84 is rotated integral with the side gear 82 but is axially slidable relative to the side gear 82. At one end of each side gear piece 84 facing to the pinion shaft 36, a cylindrical positioning protrusion 90 is provided, and on an outer peripheral surface thereof one end of a coil spring 88 is attached. Other end of the coil spring 88 is attached to an outer peripheral surface of the positioning protrusion 54a of the positioning member 54 fixedly provided on the pinion shaft 36. Thus, the side gear piece 84 is biased toward the side gear shaft 86 by the coil spring 88. The side gear shaft 86 is rotatably supported in a hole of the differential case 28 to be coaxial with the side gear piece 84.

On an abut surface 91 at end of each side gear piece 84 abutting to the side gear shaft 86, plural engaging teeth 92a to be explained later are formed. These engaging teeth 92a are meshed with plural engaging teeth 92b formed on an end surface of the side gear shaft 86. In the second embodiment, the side gear pieces 84 correspond to the claimed first rotary member, and the side gear shafts 86 correspond to the claimed second rotary member, both being rotatable about the common axis C. The coil springs 88 correspond to the claimed biasing mechanism.

Figure 6:
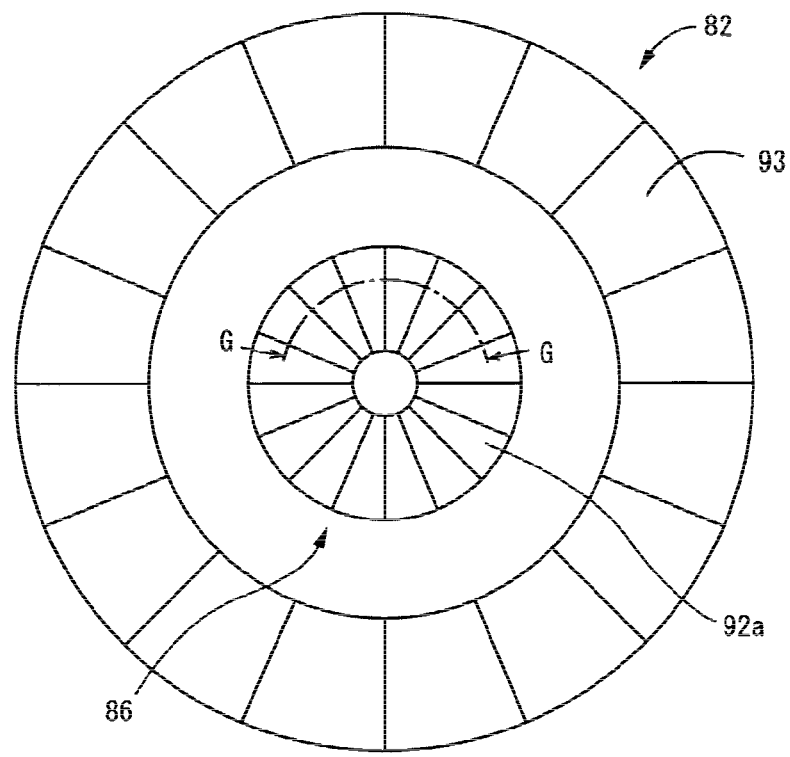
FIG. 6 view taken along a line E in FIG. 5 and shows a side gear and a side gear shaft.

FIG. 6 is a schematic view of the side gear 82 and the side gear shaft 86 viewed in the direction of an arrow E in FIG. 5. Radially outer plural engaging teeth 93 of the side gear 82 mesh with the pinion gear 38, and radially inner plural engaging teeth 92b of the side gear shaft 86 mesh with the engaging teeth 92a of the side gear piece 84. Apparently, the engaging teeth 93 and 92a are formed to extend radially in the side gear shaft 86 and the side gear 82.

Figure 7:
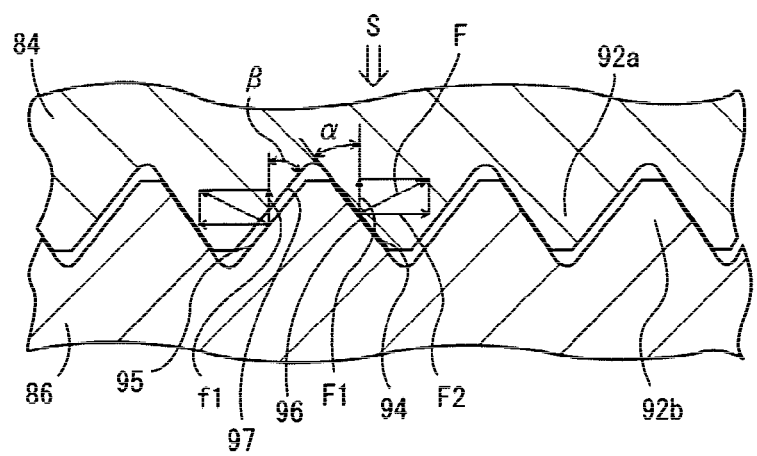
FIG. 7 is a cross-section taken along a line G in FIG. 6.

FIG. 7 is a cross section taken along a line G of the engaging teeth 92b of the side gear shaft 86, in which the engaging teeth 92a of the side gear piece 84 are also shown to show the meshed state. One tooth surface 94 of the engaging tooth 92b is provided by the pressure angle α, while other tooth surface 95 is provided by the pressure angle β, thus values of both pressure angles being different each other. Similarly, one tooth surface 96 and other tooth surface 97 of the engaging tooth 92a are respectively provided by the pressure angle α and the pressure angle β.

In the differential gear unit 80 thus constructed, the driving torque is transmitted from the pinion shaft 36, via the pinion gears 38, the side gears 82 and the side gear pieces 84, to the side gear shafts 44, while the reacting torque is transmitted in the reverse direction. In the transmitting path of the driving torque, the side gear piece 84 is located upstream of the side gear shaft 86. The engaging teeth 92a of the side gear piece 84 and the engaging teeth 92b of the side gear shaft 86 are meshed with each other, so that the force F perpendicular to the tooth surface 94 and resulted from the reacting torque acts from the tooth surface 94 to the tooth surface 96.

Due to the pressure angle α, this force F is decomposed to a thrust component F1 and a circumferential component F2. The thrust component F1 functions to disengage the engaging tooth 92a from the engaging tooth 92b, while the circumferential component F2 functions to transmit the driving torque from the engaging tooth 92a to the engaging tooth 92b.

Here, when the thrust component F1 exceeds the biasing force S, the side gear piece 84 is shifted to be remote away from the side gear shaft 86 so that the engaging teeth 92a are disengaged from the engaging teeth 92b. Also, the critical torque value at which the mutual engagement is disengage can be freely selected by changing value of the pressure angle α, and biasing force of the coil spring 88.

The other tooth surface 95 of the engaging tooth 92a opposite to the one tooth surface 94, and other tooth surface 97 of the engaging tooth 92b opposite to the one tooth surface 96, are provided by the pressure angle β. Upon reverse running of the vehicle, the tooth surface 95 abuts onto the tooth surface 97, so that magnitude of the thrust component F1 is determined by value the pressure angle β. In this way, different values of the critical torque which is selected for the forward running and the reverse running can be adjusted according to the strength required.

According to the second embodiment as described above, the paired side gear pieces 84 functioning as the first rotary member and the paired side gear shafts 86 functioning as the second rotary member are respectively provided with the engaging teeth 92a and the engaging teeth 92b. The one tooth surfaces 94 and 96 are formed to have the same pressure angle α.

Accordingly, when the torque of the magnitude larger than the predetermined threshold value is inputted into the differential gear unit 80 from the pinion shaft 36 or from the paired side gear shafts 86, due to the pressure angle α of the tooth surfaces 94 and 96, the side gear piece 84 is shifted axially, so that top portions of the engage teeth 92a get over top portion of the engaging teeth 92b. In this way, transmitting of the excessive drive torque and the reacting torque can be limited at the differential gear unit 80.

According to the second embodiment, following advantages can be brought. Firstly, the one tooth surfaces 94 and 96, and the other tooth surfaces 95 and 97, are provided by different value of the pressure angles α and β, respectively. In this way, the critical torque value at which the engagement between the engaging teeth 92a and 92b is disengaged from each other can be altered for the forward running and the reverse running. Thus, transmission of the excessive torque limited for the forward running and the reverse running suitably.

Secondly, the coil spring 88 used as the biasing mechanism for biasing the side gear piece 84 toward the side gear shaft 86, can always apply the biasing force of constant value. In addition, exchanging of the coil spring 88 can adjust the biasing force corresponding to the condition required. Thirdly, the positioning protrusion 54a of the positioning member 54 attached to the pinion shaft 36, and the positioning protrusion 90 attached to the side gear piece 84 cooperate to secure the coil spring 88 at the predetermined position, whereby shift or disengagement of the coil spring 88 by shock etc. can be prevented.

Third Embodiment

Next, a third embodiment of the present invention will be explained with reference to FIG. 8. In this explanation, the members having the same structure as the first embodiment are given the corresponding reference numerals for simplicity of the explanation.

Figure 8:
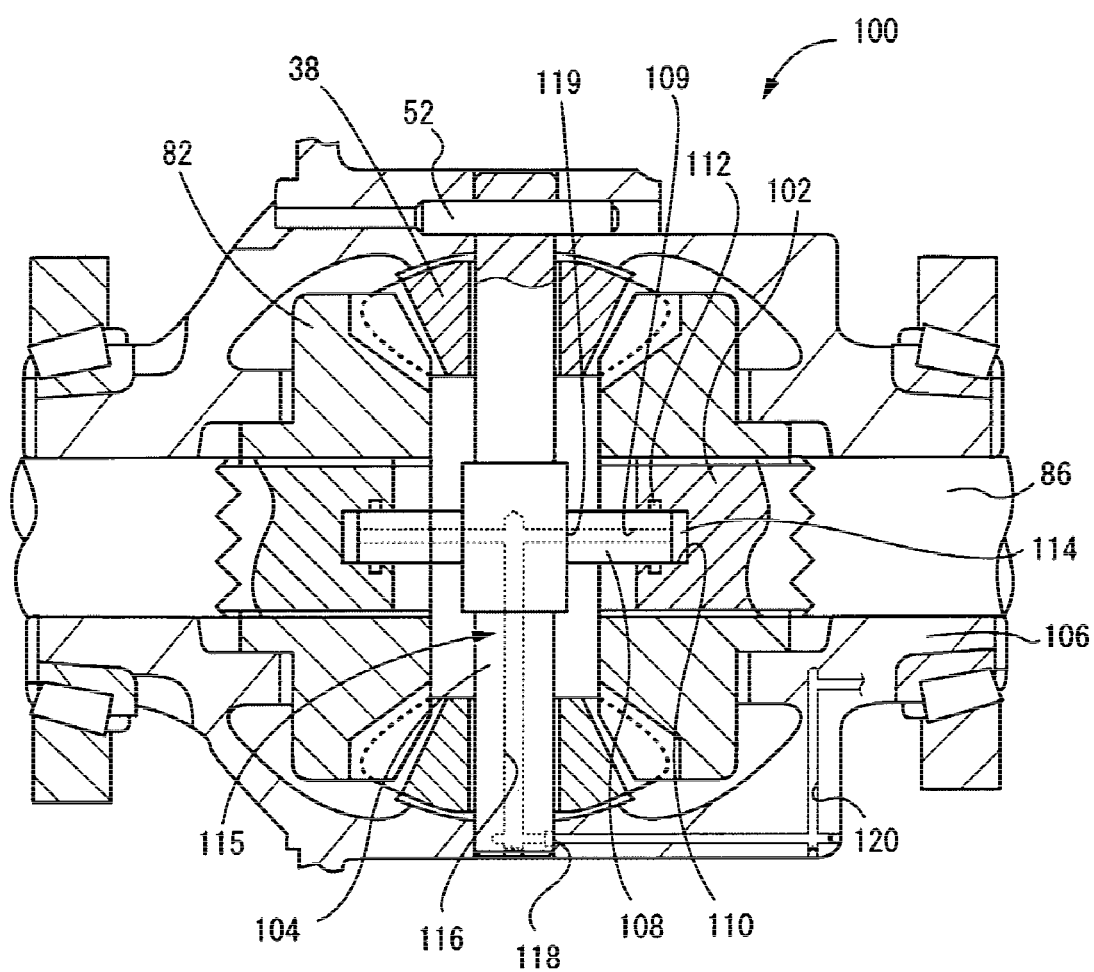
FIG. 8 is a cross section of a differential gear unit of a third embodiment according to the present invention.

FIG. 8 is a cross section of a main portion of a differential gear unit 100 according to the third embodiment. The differential gear unit 100 is different from the differential gear unit 80 of the second embodiment in the structure of a paired side gear pieces 102, a pinion shaft 104, and a differential case 106, and the biasing mechanism is comprised of a hydraulic circuit 115.

To the pinion shaft 104 a pair of hydraulic oil supplying shaft 108 of cylindrical shape are fixedly attached. One end of each hydraulic oil supplying shaft 108 is inserted into an oil hole 110 formed in an end of the side gear piece 102, so that the hydraulic oil supplying shaft 108 can be rotated relative to the side gear piece 102, and so that an oil chamber 114 is formed. An oil seal 112 is disposed between an end portion of the hydraulic oil shaft 108 and the oil hole 110.

In the pinion shaft 104, an oil passage 116 is formed which extends from one end 118 located an end of the pinion shaft 104 opposite to an end where the fixing pin 52 is penetrated, to other end 119 located at an intermediate portion thereof. The one end 118 forming an inlet or supplying port is communicated with an oil passage 120 formed in a differential case 106, and the oil passage 120 is communicated with an oil passage (not shown) in the housing 20 (refer to FIG. 1). The other end of the oil passage 116 forming an outlet or the discharge port is communicated with an oil passage 109 formed in the hydraulic oil supplying shaft 108.

In the differential gear unit 100 thus constructed, the pressurized hydraulic oil is supplied from the oil passage 120 in the differential case 106, through the oil passage 116 in the pinion shaft 104 and the oil passage 109 in the hydraulic oil supplying passage 108, to the pressurized oil chamber 114. The hydraulic pressure generated by the pressurized hydraulic oil in the pressurized oil chamber 114 biases the side gear piece 102 toward the side gear shaft 86.

As described above, according to the third embodiment, using of the pressurized hydraulic circuit 115 as the biasing mechanism brings, in addition to the advantage which is the same as the first and second embodiments, following advantage. That is, the pressurized hydraulic circuit 115 can generate the lager biasing force than that of the disc spring 48 or the coil spring 88, which is conveniently used for a special vehicle requiring a large power transmission limiting force.

In the above description, various embodiments of the present invention were explained with reference to the attached drawing, but the present invention can be embodied in various modes other than the above embodiments. In detail, the transmitting torque limiting apparatus of the present invention can be applied, other than the differential gear unit, to the power transmitting apparatus such as the propeller shaft and the transmission as well. Also, the transmitting torque limiting apparatus can be applied to, in addition to the FR type vehicle, other type driving system, for example to a FF (front engine, front drive) type vehicle.

Also, the pressurized pressurized hydraulic circuit 115 in the third embodiment can be applied to the differential gear unit 14 in the first embodiment. In the first embodiment, the positioning protrusion 54a for securing the disc spring 48 can be provided on the side gear piece 42, instead on the pinion shaft 36. Further, other biasing mechanism such as an electronically controlled cam can be used, instead of the disc spring 48, the coil spring 88 or the hydraulic circuit 115 in the first, second or third embodiment.

While the preferable embodiments of the present invention have been illustrated above, it is to be understood that the present invention is not limited to the details of the illustrated embodiments, but may be embodied with various other changes, modifications and improvements, which may occur to those skilled in the art, without departing from the sprit and scope of the present invention defined in the following claims.

The invention claimed is:

1. A transmitting torque limiting apparatus for a vehicle, constructing a part of a power transmitting apparatus disposed in a power transmitting path extending from a power source to driving wheels, for limiting inputting of an excessive torque into the power transmitting apparatus, comprising:
   a first rotary member rotated about an axis by the power source;
   a second rotary member disposed adjacent to the first rotary member on the power transmitting path to be rotated about the axis;
   first engaging teeth and second engaging teeth respectively provided on the first rotary member and the second rotary member to be meshed with each other; and
   a biasing mechanism for biasing one of the first rotary member and the second rotary member which is shiftable toward other of the first rotary member and the second rotary member so that the first engaging teeth and the second engaging teeth are meshed with each other, the biasing mechanism being disposed coaxially with the second rotary member and one end of the biasing member being abutted to the shiftable rotary member to bias the shiftable rotary member toward the non-shiftable rotary member;
   wherein each of the first engaging teeth and each of the second engaging teeth are provided with a pressure angle of predetermined value which function to shift the shiftable rotary member against biasing force by the biasing mechanism to thereby disengage engagement between the first engaging teeth and the second engaging teeth, when an excessive torque larger than a predetermined value is inputted to the first rotary member or the second rotary member,
   wherein the transmitting torque limiting apparatus is a differential gear unit including a pair of side gears, a pair of side gear pieces, and a pair of side gear shafts, and
   wherein the side gears constructing the first rotary member are rotatably fitted on an outer peripheral surface of the side gear shafts,
   the side gear pieces constructing the second rotary member are spline-fitted on an outer peripheral surface of the side gear shafts to be rotated integral therewith and axially shiftable relative thereto, and to be adjacent to the side gears, and
   the first engaging teeth and the second engaging teeth are respectively provided on an abutment surface of the side gears and an abutment surface of the side gear pieces adjacent thereto.

2. The transmitting torque limiting apparatus for a vehicle according to claim 1, wherein a pair of tooth surfaces of each of the first engaging teeth are provided with pressure angles of different values, and a pair of tooth surfaces of each of the second engaging teeth are provided with pressure angles of different values.

3. The transmitting torque limiting apparatus for a vehicle according to claim 1, wherein the biasing mechanism is a disc spring or a coil spring.

4. The transmitting torque limiting apparatus for a vehicle according to claim 2, wherein the biasing mechanism is a disc spring or a coil spring.

5. A transmitting torque limiting apparatus for a vehicle, constructing a part of a power transmitting apparatus disposed in a power transmitting path extending from a power source to driving wheels, for limiting inputting of an excessive torque into the power transmitting apparatus, comprising:
   a first rotary member rotated about an axis by the power source;
   a second rotary member disposed adjacent to the first rotary member on the power transmitting path to be rotated about the axis;
   first engaging teeth and second engaging teeth respectively provided on the first rotary member and the second rotary member to be meshed with each other; and
   a biasing mechanism for biasing one of the first rotary member and the second rotary member which is shiftable toward other of the first rotary member and the second rotary member so that the first engaging teeth and the second engaging teeth are meshed with each other;
   wherein each of the first engaging teeth and each of the second engaging teeth are provided with a pressure angle of predetermined value which function to shift the shiftable rotary member against biasing force by the biasing mechanism to thereby disengage engagement between the first engaging teeth and the second engaging teeth, when an excessive torque larger than a predetermined value is inputted to the first rotary member or the second rotary member, and
   wherein the biasing mechanism includes a pressurized oil chamber which contains a pressurized hydraulic oil for biasing the shiftable rotary member toward the non-shiftable rotary member.

6. The transmitting torque limiting apparatus for vehicle according to claim 5, wherein a pair of tooth surfaces of each of the first engaging teeth are provided with pressure angles of different values, and a pair of tooth surfaces of each of the second engaging teeth are provided with pressure angles of different values.

7. The transmitting torque limiting apparatus for a vehicle according to claim 3, wherein the differential gear unit includes a pair of the disc springs, and
   the biasing mechanism is constructed by the pair of disc springs biasing the side gear pieces toward the side gears.

8. A transmitting torque limiting apparatus for a vehicle, constructing a part of a power transmitting apparatus disposed in a power transmitting path extending from a power source to driving wheels, for limiting inputting of an excessive torque into the power transmitting apparatus, comprising:
   a first rotary member rotated about an axis by the power source;
   a second rotary member disposed adjacent to the first rotary member on the power transmitting path to be rotated about the axis;

first engaging teeth and second engaging teeth respectively provided on the first rotary member and the second rotary member to be meshed with each other; and a biasing mechanism for biasing one of the first rotary member and the second rotary member which is shiftable toward other of the first rotary member and the second rotary member so that the first engaging teeth and the second engaging teeth are meshed with each other;

wherein each of the first engaging teeth and each of the second engaging teeth are provided with a pressure angle of predetermined value which function to shift the shiftable rotary member against biasing force by the biasing mechanism to thereby disengage engagement between the first engaging teeth and the second engaging teeth, when an excessive torque larger than a predetermined value is inputted to the first rotary member or the second rotary member, wherein the biasing mechanism is a disc spring or a coil spring which is disposed coaxially with the second rotary member and of which one end is abutted to the shiftable rotary member to bias the shiftable rotary member toward the non-shiftable rotary member, wherein the transmitting torque limiting apparatus is a differential gear unit including a pair of side gears, a pair of side gear pieces, a pair of side gear shafts, and a pair of the coil springs, and wherein the side gear pieces constructing the first rotary member are spline-fitted on an inner peripheral surface of the side gears to be rotated integral therewith and axially shiftable relative thereto;

the side gear shafts constructing the second rotary member are adjacent to the side gear pieces, the first engaging teeth and the second engaging teeth are respectively provided on an abutment surface of the side gear pieces and an abutment surface of the side gear shafts adjacent thereto, and the biasing mechanism is constructed by the pair of coil springs biasing the side gear pieces toward the side gear shafts.

9. The transmitting torque limiting apparatus for a vehicle according to claim 7, wherein each of the side gears has an annular shape, each of the side gear piece has an annular shape having a diameter smaller than that of the side gear, and the side gear piece is held in a recess formed on an end surface of the side gear in a nested state.

10. The transmitting torque limiting apparatus for a vehicle according to claim 8, wherein the side gear pieces and the side gear shafts have respectively a cylindrical shape, and are disposed to form one line.

11. The transmitting torque limiting apparatus for a vehicle according to claim 7, wherein a driving torque is transmitted via the side gears, the side gear pieces and the side gear shafts in this order, and in the transmitting path of driving torque the side gears are disposed upstream of the side gear pieces.

12. The transmitting torque limiting apparatus for a vehicle according to claim 8, wherein a driving torque is transmitted via the side gears, the side gear pieces and the side gear shafts in this order, and in the transmitting path of driving torque the side gear pieces are disposed upstream of the side gear shafts.

13. The transmitting torque limiting apparatus for a vehicle according to claim 1, wherein a diameter of the outer peripheral surface of the side gear shafts is smaller than a nominal diameter of the side gear shafts.

* * * * *